United States Patent
Chen et al.

(10) Patent No.: US 7,850,236 B2
(45) Date of Patent: Dec. 14, 2010

(54) ROTATABLE ARMREST ASSEMBLY

(75) Inventors: Shun-Min Chen, Taipei (TW); Jian-Qun Li, Taipei (TW)

(73) Assignee: Wonderland Nurserygoods Company Limited, Central (HK)

( * ) Notice: Subject to any disclaimer, the term of this patent is extended or adjusted under 35 U.S.C. 154(b) by 22 days.

(21) Appl. No.: 12/355,026

(22) Filed: Jan. 16, 2009

(65) Prior Publication Data

US 2009/0184558 A1    Jul. 23, 2009

Related U.S. Application Data

(60) Provisional application No. 61/021,727, filed on Jan. 17, 2008.

(51) Int. Cl.
A47D 1/10 (2006.01)
A47C 7/54 (2006.01)
B60N 2/46 (2006.01)

(52) U.S. Cl. ............ 297/250.1; 297/411.26; 297/411.27; 297/411.3; 297/411.31; 297/411.35; 297/411.37

(58) Field of Classification Search ........... 297/250.1, 297/411.26, 411.27, 411.3, 411.31, 411.35, 297/411.37

See application file for complete search history.

(56) References Cited

U.S. PATENT DOCUMENTS

| | | | |
|---|---|---|---|
| 3,992,056 A | | 11/1976 | Koziatek et al. |
| 5,255,956 A | * | 10/1993 | Stevens ............... 297/411.26 |
| 5,369,805 A | * | 12/1994 | Bergsten et al. ...... 297/411.35 |
| 5,474,355 A | * | 12/1995 | Lerner et al. ...... 297/411.31 X |
| 5,597,207 A | * | 1/1997 | Bergsten et al. ...... 297/411.35 |
| 5,810,445 A | * | 9/1998 | Surot ................. 297/411.37 |
| 5,851,054 A | * | 12/1998 | Bergsten et al. ...... 297/411.35 |
| 5,884,974 A | * | 3/1999 | Bergsten et al. ...... 297/411.35 |
| 5,908,221 A | * | 6/1999 | Neil ................. 297/411.37 X |
| 6,086,156 A | * | 7/2000 | Breen et al. ......... 297/411.37 |
| 6,203,109 B1 | * | 3/2001 | Bergsten et al. ...... 297/411.35 |
| 6,394,553 B1 | | 5/2002 | McAllister et al. |
| 6,588,847 B2 | * | 7/2003 | Murakami ........... 297/411.37 |
| 6,698,838 B2 | * | 3/2004 | Kain ................. 297/250.1 X |

(Continued)

FOREIGN PATENT DOCUMENTS

DE     20006227 U1     8/2000

(Continued)

OTHER PUBLICATIONS

Chinese Office Action dated Mar. 26, 2010 for Appln. No. 200910005519.8.

(Continued)

*Primary Examiner*—Rodney B White
(74) *Attorney, Agent, or Firm*—Pillsbury Winthrop Shaw Pittman, LLP

(57) ABSTRACT

A rotatable armrest assembly comprises: an armrest support adapted to be connected to a base of the child car seat and having an insert hole; and an armrest having top and bottom ends that are opposite to each other in an axial direction, and provided with a shaft that extends into the insert hole so as to permit the armrest to be rotatable relative to the armrest support about an axis of the shaft that extends in the axial direction.

9 Claims, 4 Drawing Sheets

U.S. PATENT DOCUMENTS

| | | | |
|---|---|---|---|
| 6,752,462 B1 * | 6/2004 | Kain et al. | 297/250.1 X |
| 6,908,151 B2 * | 6/2005 | Meeker et al. | 297/250.1 |
| 7,066,536 B2 * | 6/2006 | Williams et al. | 297/250.1 |
| 7,278,683 B2 * | 10/2007 | Williams et al. | 297/250.1 |
| 7,322,647 B2 * | 1/2008 | Munn et al. | 297/250.1 |
| 7,370,912 B2 * | 5/2008 | Williams et al. | 297/250.1 X |
| 7,380,886 B1 * | 6/2008 | Copello | 297/411.35 |
| 7,384,102 B2 * | 6/2008 | Chen et al. | 297/250.1 X |
| 7,452,032 B1 * | 11/2008 | Roleder et al. | 297/411.35 X |
| 7,611,205 B2 * | 11/2009 | Chen et al. | 297/250.1 X |
| 7,637,568 B2 * | 12/2009 | Meeker et al. | 297/250.1 |
| 2003/0151282 A1 * | 8/2003 | Williams et al. | 297/250.1 |
| 2003/0155797 A1 * | 8/2003 | Amirault et al. | 297/250.1 |
| 2004/0070244 A1 * | 4/2004 | Williams et al. | 297/250.1 |
| 2004/0189068 A1 * | 9/2004 | Meeker et al. | 297/250.1 |
| 2004/0245822 A1 * | 12/2004 | Balensiefer et al. | 297/250.1 |
| 2005/0082888 A1 * | 4/2005 | Williams et al. | 297/250.1 |
| 2005/0151402 A1 * | 7/2005 | Balensiefer et al. | 297/250.1 |
| 2007/0013216 A1 * | 1/2007 | Yeh | 297/250.1 |
| 2007/0236061 A1 * | 10/2007 | Meeker et al. | 297/250.1 |
| 2008/0030054 A1 * | 2/2008 | Williams et al. | 297/250.1 |
| 2008/0067843 A1 * | 3/2008 | Baloga et al. | 297/411.3 X |
| 2008/0203802 A1 * | 8/2008 | LaFreniere | 297/411.35 |
| 2009/0322138 A1 * | 12/2009 | Sellers | 297/411.27 |

FOREIGN PATENT DOCUMENTS

| | | |
|---|---|---|
| DE | 10 2007 023 240 A1 | 12/2007 |
| EP | 0751035 B1 | 3/2000 |
| EP | 1356986 B1 | 2/2006 |
| KR | 2007-0060193 | 6/2001 |

OTHER PUBLICATIONS

Search Report for GB0900757.6 dated. Mar. 13, 2009.

* cited by examiner

ROTATABLE ARMREST ASSEMBLY

CROSS-REFERENCE TO RELATED APPLICATIONS

This application claims priority of U.S. Provisional Application No. 61/021,727, filed on Jan. 17, 2008.

BACKGROUND OF THE INVENTION

1. Field of the Invention

This invention relates to an armrest assembly, more particularly to a rotatable armrest assembly for facilitating ingress and egress of a child to and from a child car seat.

2. Description of the Related Art

A child car seat is placed in a vehicle for securing a child in the vehicle and for protecting the child in case of an accident. The child car seat normally includes a base and a pair of armrests provided on two lateral sides of the base. In general, there are two types of armrests for child car seats, namely, stationary-type armrests movable-type armrests. Most commercially available child car seat armrests are a movable-type armrests, such as the one disclosed in U.S. Pat. No. 6,682,143. However, conventional child car seat armrests are rotatable upwardly and downwardly, and as such, are not suitable for holding articles, such as bottles and cans.

SUMMARY OF THE INVENTION

Therefore, an object of the present invention is to provide a rotatable armrest assembly that can overcome the aforesaid drawback associated with the prior art.

According to this invention, there is provided a rotatable armrest assembly that comprises: an armrest support adapted to be connected to a base of the child car seat and having an insert hole; and an armrest having top and bottom ends that are opposite to each other in an axial direction, and provided with a shaft that extends into the insert hole so as to permit the armrest to be rotatable relative to the armrest support about an axis of the shaft that extends in the axial direction.

BRIEF DESCRIPTION OF THE DRAWING

Other features and advantages of the present invention will become apparent in the following detailed description of the preferred embodiment of this invention, with reference to the accompanying drawings, in which.

DETAILED DESCRIPTION OF THE PREFERRED EMBODIMENT

Figure 1:
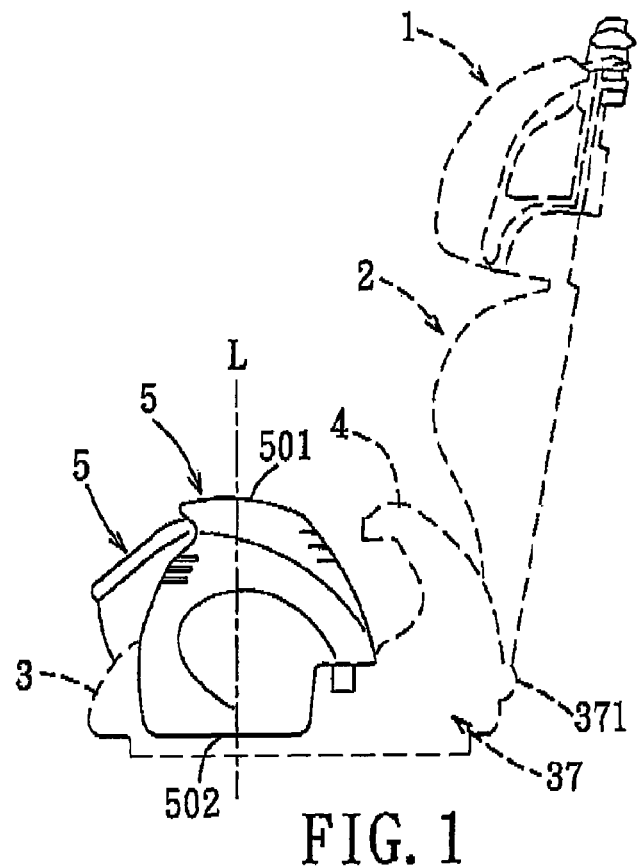
FIG. 1 is a schematic side view of the preferred embodiment of a rotatable armrest assembly according to this invention.
Figure 2:
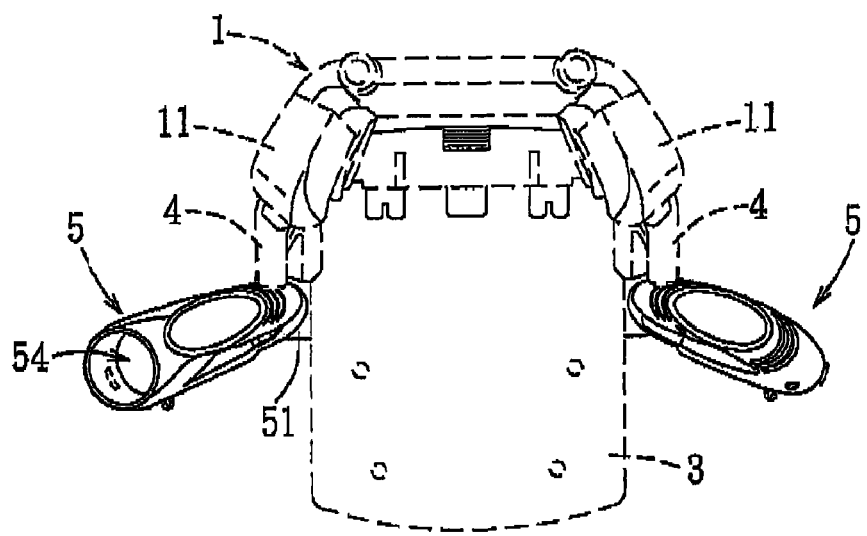
FIG. 2 is a schematic top view of the preferred embodiment.
Figure 3:
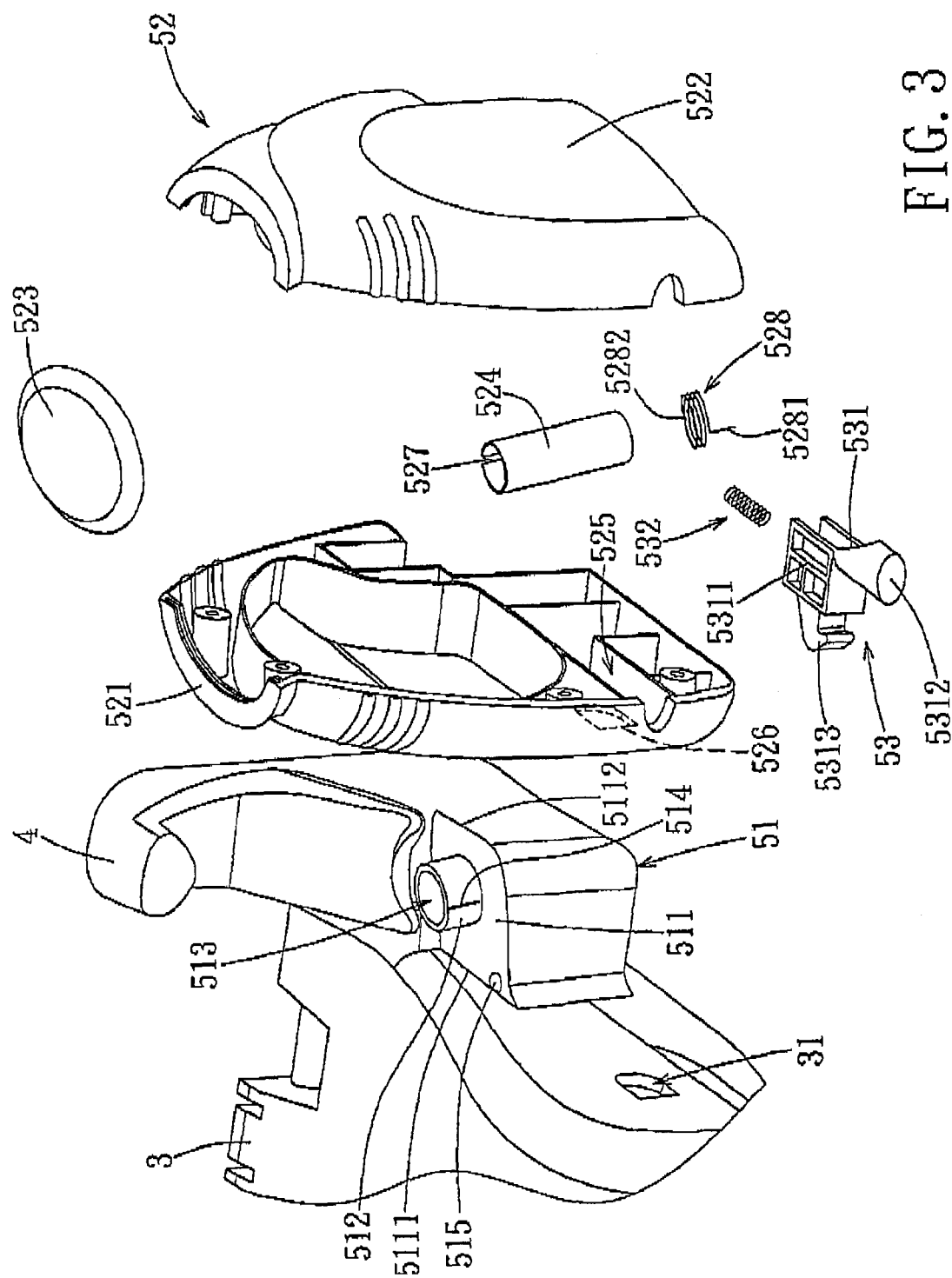
FIG. 3 is an exploded perspective view of the preferred embodiment.

FIGS. 1 to 4 illustrate the preferred embodiment of a rotatable armrest assembly for a child car seat according to this invention.

The child car seat includes a headrest 1, a backrest 2, a base 3, a pair of safety belt guiding mechanisms 4 disposed respectively at two opposite lateral sides of the base 3, and a pair of armrest assemblies 5 disposed respectively at the lateral sides of the base 3. The headrest 1 is capable of height adjustment. Each of the headrest 1 and the backrest 2 includes wings that are width adjustable so as to permit children of different ages to use the child car seat and/or to provide a more closed-in seating area when desired. Each of the lateral sides of the base 3 is formed with a locking hole 31.

Each of the rotatable armrest assembles 5 includes an armrest support 51, an armrest 52, and a locking unit 53.

The armrest support 51 of each of the rotatable armrest assemblies 5 is connected to a respective one of the lateral sides of the base 3, and has a laterally extending mounting surface 511 and a tubular wall 512 protruding upwardly from the mounting surface 511. The armrest support 51 is formed with an insert hole 513. The tubular wall 512 defines an upper section of the insert hole 513.

The armrest 52 of each of the armrest assemblies 5 has top and bottom ends 501, 502 that are opposite to each other in an axial direction (L), is provided with a shaft 524, and includes first and second shell halves 521, 522 and a coupling cap 523 interconnecting the first and second shell halves 521, 523. The first and second shell halves 521, 523 have recessed rear end portions that cooperatively define a shaft-receiving hole for receiving fittingly and securely the shaft 524 therein, and front end portions that cooperatively define a lock-guiding hole 525. The first shell half 521 is formed with a through-hole 526 in spatial communication with the lock-guiding hole 525. The shaft 524 extends into the insert hole 513 so as to permit the armrest 52 to be rotatable relative to the armrest support 51 about an axis of the shaft 524 that extends in the axial direction (L).

Figure 4:
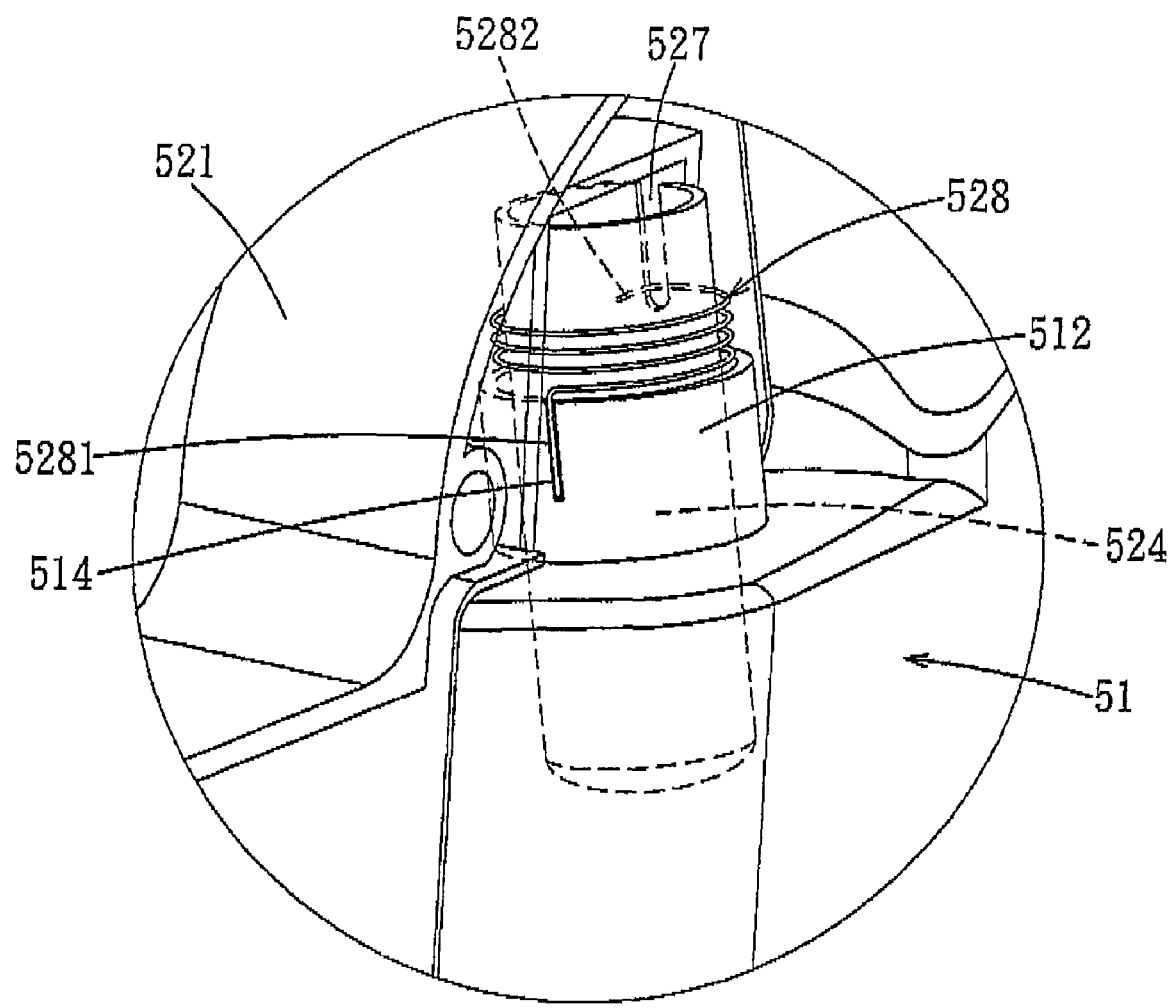
FIG. 4 is a fragmentary perspective view of the preferred embodiment.
Figure 5:
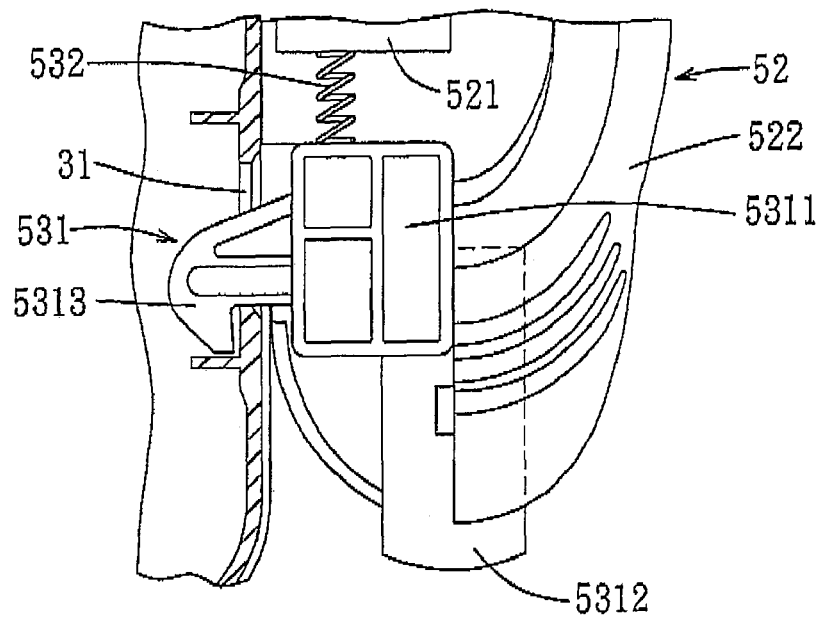
FIG. 5 is a fragmentary schematic top view of the preferred embodiment illustrating a state where a spring-biased latch is disposed at a locking position.
Figure 6:
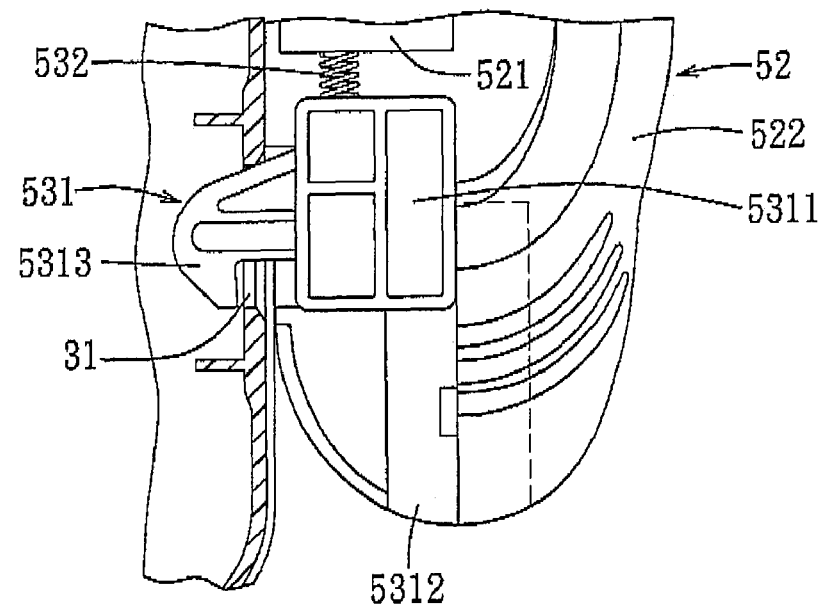
FIG. 6 is a fragmentary schematic top view of the preferred embodiment illustrating another state where the spring-biased latch is disposed at an unlocking position.

Referring now to FIGS. 5 and 6, in combination with FIGS. 1 to 4, the locking unit 53 includes a spring-biased latch 531 and an urging member 532. The spring-biased latch 531 includes a main portion 5311, a pressing portion 5312 extending from a front end of the main portion 5311, and a hook portion 5313 extending from one side of the main portion 5311. The spring-biased latch 531 is movably mounted in the lock-guiding hole 525. The hook portion 5313 extends through the through-hole 526. The pressing portion 5312 is exposed from the armrest 52 to allow the user to press the same. The urging member 532 is a compression spring, is disposed in the lock-guiding hole 525, and has two opposite ends abutting against the main portion 5311 and the first shell half 521 for urging the spring-biased latch 531 to move frontwardly such that the hook portion 5313 is moved to engage releasably the locking hole 31 in the base 3 (see FIG. 5), thereby preventing rotation of the armrest 52 about the axis. When it is desirable to permit ingress or egress of a child to and from the child car seat, the user can press the pressing portion 5312 of the spring-biased latch 531 so as to disengage the hook portion 5313 from the locking hole 31 (see FIG. 6), thereby permitting outward rotation of the armrest 52 about the axis to a fully open position.

Referring now to FIG. 4, the tubular wall 512 is formed with a retaining groove 514, and the shaft 524 is formed with a retaining groove 527. A torsion spring 528 is sleeved on the shaft 524, and has one end 5281 retained in the retaining groove 514 in the tubular wall 512, and the other end 5282 retained in the retaining groove 527 in the shaft 524 for restoring the armrest 52 to its original position.

Alternatively, restoration of the armrest 52 can be realized in a different manner without the use of the torsion spring 528. In one example, the mounting surface 511 of the armrest support 51 has a first side 5111 (see FIG. 3) and a second side 5112 opposite to the first side 5111 and having a level greater than that of the first side 5111 such that the mounting surface 511 is inclined downwardly from the second side 5112 toward the first side 5111 so as to permit the armrest 52 to rotate automatically about the axis to be restored to its original position by virtue of gravity.

In order to prevent the armrest 52 from pinching the fingers of the child during returning thereof to its original position, the mounting surface 511 of the armrest support 51 is formed with a stopper 515 protruding therefrom and disposed adjacent to the first side 5111 of the mounting surface 511 for stopping movement of the armrest 52 toward the first side 5111 of the mounting surface 51. The stopper 515 has a size and a shape such that the user can easily push the armrest 52 to pass thereover.

By making the armrest 52 to be rotatable about the axis that extends in the axial direction (L), ingress and egress of the child to and from the child car seat is facilitated. Moreover, the armrest 52 of each of the armrest assemblies 5 can be formed with an article-holding recess 54 for receiving articles, such as bottles, cans, and the like.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A rotatable armrest assembly for a child car seat, comprising:
    an armrest support adapted to be connected to a base of the child car seat and having an insert hole;
    an armrest having top and bottom ends that are opposite to each other in an axial direction, and provided with a shaft that extends into said insert hole in said armrest support so as to permit said armrest to be rotatable relative to said armrest support about an axis of said shaft that extends in the axial direction, said armrest being formed with a through-hole; and
    a locking unit including a spring-biased latch provided on the armrest and a hook portion that extends through the through-hole, the hook portion being configured to releasably engage a locking hole in the base of the child car seat.

2. The rotatable armrest assembly of claim 1, wherein said armrest support is formed with a tubular wall protruding therefrom in the axial direction and defining an upper section of said insert hole, said tubular wall being formed with a retaining groove, said shaft being formed with a retaining groove, said rotatable armrest assembly further comprising a torsion spring having one end retained in said retaining groove in said tubular wall, and the other end retained in said retaining groove in said shaft for restoring said armrest to its original position.

3. The rotatable armrest assembly of claim 1, wherein said armrest support has a mounting surface, said armrest being mounted rotatably on said mounting surface, said mounting surface having a first side and a second side opposite to said first side and having a level greater than that of said first side such that said mounting surface is inclined downwardly from said second side toward said first side so as to permit said armrest to be automatically restored to its original position by virtue of gravity.

4. The rotatable armrest assembly of claim 3, wherein said mounting surface is formed with a stopper protruding therefrom and disposed adjacent to said first side of said mounting surface for stopping movement of said armrest toward said first side of said mounting surface.

5. The rotatable armrest assembly of claim 1, wherein said armrest includes first and second shell halves and a coupling cap interconnecting said first and second shell halves.

6. The rotatable armrest assembly of claim 1, wherein said armrest is formed with an article-holding recess.

7. A rotatable armrest assembly for a child car seat, comprising:
    an armrest support adapted to be connected to a base of the child car seat and having an insert hole; and
    an armrest having top and bottom ends that are opposite to each other in an axial direction, and provided with a shaft that extends into said insert hole in said armrest support so as to permit said armrest to be rotatable relative to said armrest support about an axis of said shaft that extends in the axial direction,
    wherein said armrest support is formed with a tubular wall protruding therefrom in the axial direction and defining an upper section of said insert hole, said tubular wall being formed with a retaining groove, said shaft being formed with a retaining groove, said rotatable armrest assembly further comprising a torsion spring having one end retained in said retaining groove in said tubular wall, and the other end retained in said retaining groove in said shaft for restoring said armrest to its original position.

8. A rotatable armrest assembly for a child car seat, comprising:
    an armrest support adapted to be connected to a base of the child car seat and having an insert hole; and
    an armrest having top and bottom ends that are opposite to each other in an axial direction, and provided with a shaft that extends into said insert hole in said armrest support so as to permit said armrest to be rotatable relative to said armrest support about an axis of said shaft that extends in the axial direction,
    wherein said armrest support has a mounting surface, said armrest being mounted rotatably on said mounting surface, said mounting surface having a first side and a second side opposite to said first side and having a level greater than that of said first side such that said mounting surface is inclined downwardly from said second side toward said first side so as to permit said armrest to be automatically restored to its original position by virtue of gravity.

9. The rotatable armrest assembly of claim 8, wherein said mounting surface is formed with a stopper protruding therefrom and disposed adjacent to said first side of said mounting surface for stopping movement of said armrest toward said first side of said mounting surface.

* * * * *